United States Patent
Jung et al.

(10) Patent No.: US 9,196,896 B2
(45) Date of Patent: Nov. 24, 2015

(54) POROUS SILICON-BASED ELECTRODE ACTIVE MATERIAL AND SECONDARY BATTERY COMPRISING THE SAME

(75) Inventors: Hye Ran Jung, Busan (KR); Soo Jin Park, Ulsan (KR); Jung In Lee, Gyeonggi-do (KR); Yong Ju Lee, Daejeon (KR); Mi Rim Lee, Seoul (KR); Jae Phil Cho, Gyeonggi-do (KR); Je Young Kim, Daejeon (KR); Dong Sub Jung, Daejeon (KR); Yoon Ah Kang, Seoul (KR)

(73) Assignees: LG Chem, Ltd. (KR); UNIST Academy-Industry Research Corporation (KR)

( * ) Notice: Subject to any disclaimer, the term of this patent is extended or adjusted under 35 U.S.C. 154(b) by 374 days.

(21) Appl. No.: 13/566,457

(22) Filed: Aug. 3, 2012

(65) Prior Publication Data

US 2014/0030597 A1    Jan. 30, 2014

(30) Foreign Application Priority Data

Jul. 24, 2012  (KR) .................. 10-2012-0080504

(51) Int. Cl.
*H01M 6/14* (2006.01)
*H01M 4/04* (2006.01)
*H01M 4/134* (2010.01)
(Continued)

(52) U.S. Cl.
CPC ............ *H01M 4/0452* (2013.01); *C23C 18/54* (2013.01); *H01M 4/134* (2013.01); *H01M 4/1395* (2013.01); *H01M 4/364* (2013.01); *H01M 4/366* (2013.01); *H01M 4/483* (2013.01); *H01M 10/0525* (2013.01); *H01M 4/133* (2013.01); *H01M 4/1393* (2013.01); *Y02E 60/122* (2013.01); *Y02T 10/7011* (2013.01)

(58) Field of Classification Search
CPC .......... H01M 2/00; H01M 4/00; H01M 10/00
USPC ......... 429/302, 209, 212, 231.7, 231.95, 251, 429/252
See application file for complete search history.

(56) References Cited

U.S. PATENT DOCUMENTS

| 5,395,711 A | 3/1995 | Tahara et al. |
| 5,948,713 A | 9/1999 | Smiley et al. |

(Continued)

FOREIGN PATENT DOCUMENTS

| CN | 102157731 A | 8/2011 |
| CN | 102214823 A | 10/2011 |

(Continued)

OTHER PUBLICATIONS

X-Ray Diffraction Table: Minerals Arranged by X-Ray Powder Diffraction. Mineralogy Database. WebMineral.com. Web. Accessed on: May 16, 2014. >http://webmineral.com/MySQL/xray.php?ed1=4.05 &minmax=2#.U3aZGfldWI8<.

(Continued)

*Primary Examiner* — Patrick Ryan
*Assistant Examiner* — Ben Lewis
(74) *Attorney, Agent, or Firm* — Lerner, David, Littenberg, Krumholz & Mentlik, LLP

(57) ABSTRACT

Disclosed herein is a porous silicon-based electrode active material, comprising a silicon phase, a $SiO_x$ ($0<x<2$) phase and a silicon dioxide phase and having a porosity of 7-71%.

19 Claims, 1 Drawing Sheet

(51) Int. Cl.
*H01M 4/1395* (2010.01)
*H01M 4/36* (2006.01)
*H01M 4/48* (2010.01)
*H01M 10/0525* (2010.01)
*C23C 18/54* (2006.01)
*H01M 4/133* (2010.01)
*H01M 4/1393* (2010.01)

(56) References Cited

U.S. PATENT DOCUMENTS

| | | | |
|---|---|---|---|
| 6,028,127 A | 2/2000 | Yanagase et al. | |
| 6,936,643 B1 | 8/2005 | Joussen et al. | |
| 2004/0033419 A1 | 2/2004 | Funabiki | |
| 2006/0068287 A1* | 3/2006 | Morita et al. | 429/223 |
| 2007/0004824 A1 | 1/2007 | Kim et al. | |
| 2007/0049658 A1 | 3/2007 | Choi | |
| 2007/0224508 A1 | 9/2007 | Aramata et al. | |
| 2007/0243369 A1 | 10/2007 | Park et al. | |
| 2008/0145757 A1* | 6/2008 | Mah et al. | 429/219 |
| 2009/0311606 A1 | 12/2009 | Fukuoka et al. | |
| 2010/0112442 A1 | 5/2010 | Fujikawa et al. | |
| 2010/0243951 A1 | 9/2010 | Watanabe et al. | |
| 2011/0020536 A1 | 1/2011 | Yamamoto et al. | |
| 2011/0244333 A1 | 10/2011 | Kawada | |
| 2011/0244334 A1 | 10/2011 | Kawada | |
| 2011/0281164 A1* | 11/2011 | Lee et al. | 429/219 |
| 2012/0100438 A1 | 4/2012 | Fasching et al. | |
| 2012/0231326 A1 | 9/2012 | Biswal et al. | |
| 2013/0122717 A1 | 5/2013 | Green et al. | |

FOREIGN PATENT DOCUMENTS

| | | | |
|---|---|---|---|
| CN | 102214824 A | 10/2011 | |
| DE | 19920719 A1 | 11/2000 | |
| EP | 0362884 A2 | 4/1990 | |
| EP | 0814066 A1 | 12/1997 | |
| EP | 1363341 A2 | 11/2003 | |
| EP | 2416410 A2 | 2/2012 | |
| JP | H06325765 A | 11/1994 | |
| JP | 08208711 A | 8/1996 | |
| JP | 09188555 A | 7/1997 | |
| JP | 11-343156 A | 12/1999 | |
| JP | 2001089213 A | 4/2001 | |
| JP | 2001-205750 A | 7/2001 | |
| JP | 2002-042809 A | 2/2002 | |
| JP | 3685116 B2 | 4/2003 | |
| JP | 2003-317717 A | 11/2003 | |
| JP | 2004-047404 A | 2/2004 | |
| JP | 2004-071542 A | 3/2004 | |
| JP | 2004323284 A | 11/2004 | |
| JP | 2004335195 A | 11/2004 | |
| JP | 3648592 B2 | 5/2005 | |
| JP | 2005-209469 A * | 8/2005 | H01M 10/40 |
| JP | 2005209469 A | 8/2005 | |
| JP | 2005-310759 A | 11/2005 | |
| JP | 2010-225494 A | 10/2010 | |
| JP | 2011-076788 A | 4/2011 | |
| JP | 2012082126 A | 4/2012 | |
| JP | 2013509687 A1 | 3/2013 | |
| KR | 20000009774 A | 2/2000 | |
| KR | 10-0376605 B1 | 3/2003 | |
| KR | 2004-0059913 B1 | 7/2004 | |
| KR | 10-0491874 B1 | 5/2005 | |
| KR | 100555441 B1 | 2/2006 | |
| KR | 100562634 B1 | 3/2006 | |
| KR | 2009-0129504 A | 12/2009 | |
| WO | 2009119093 A1 | 10/2009 | |
| WO | 2011124893 A2 | 10/2011 | |
| WO | 2012126338 A1 | 9/2012 | |

OTHER PUBLICATIONS

Office Action from Taiwanese Application No. 96101153 citing search report with a completeion date of Jul. 29, 2010.
Supplementary European Search Report, EP 06798879, dated Dec. 3, 2009.
Kim et al. "Three-Dimensional Porous Silicon Prticles for Use in High-Performance Lithium Secondary Batteries," Angewandte Chem., 2008, 120, pp. 10305-10308.
Veluchamy et al., "Improvement of cycle behavior of SiO/C anode composite by thermochemically generated Li4SiO4 inert phase for lithium batteries," Journal of Power Sources 188 (2009) pp. 574-577.
Lee et al., "Chemical-Assisted Thermal Disproportionation of Porous Silicon Monoxide into Silicon-Based Muticomponent Systems", Angewandte Chemie International Edition, 2012, 51, 2767-2771.
Tabuchi et al.—Li-doping Process for LixSIO Negative Active Material Synthesized by Chemical Method for Lithium-Ion Cells, Available Online Jun. 2005, Journal of Power Sources, 146, 507-509.
Lee, Jung-In et al, "Highly stable Si-based multicomponent anodes for practical use in lithium-ion batteries." Energy & Environmental Science, 2012, 5, 7878-7882.
Bang, Byong Man et al., "Scalable approach to multi-dimensional bulk Si anodes via metal-assisted chemical etching." Energy and Environmental Science, 2011, 4, 5013-5019.
Chinese Office Action for Application No. 201210276140.2 dated Apr. 3, 2015.

* cited by examiner (a)
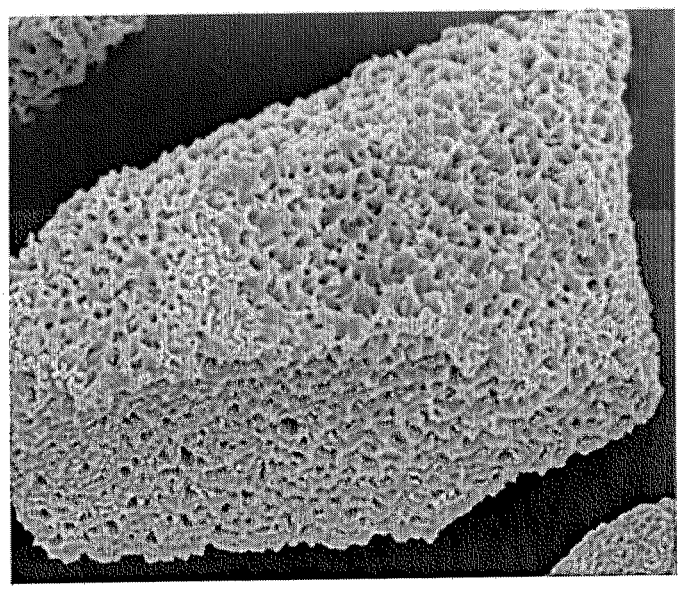
(b)
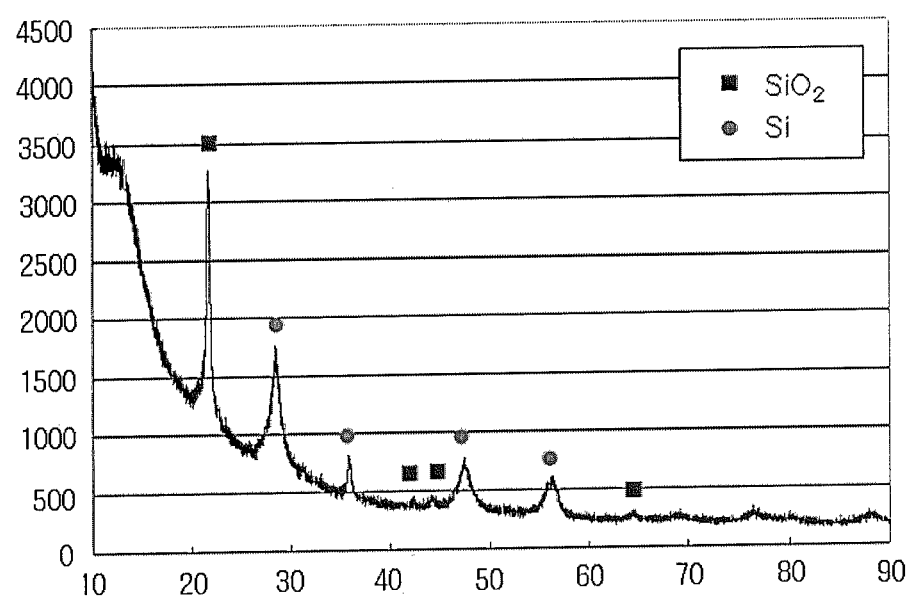

POROUS SILICON-BASED ELECTRODE ACTIVE MATERIAL AND SECONDARY BATTERY COMPRISING THE SAME

CROSS-REFERENCE TO RELATED APPLICATIONS

This application claims the priority of Korean Patent Application No. 10-2012-0080504 filed on Jul. 24, 2012 in the Korean Intellectual Property Office, the disclosure of which is incorporated herein by reference.

BACKGROUND OF THE INVENTION

1. Field of the Invention

The present invention relates to a porous silicon-based electrode active material and a secondary battery comprising the same.

2. Description of the Prior Art

Since the discovery of electricity in the 1800s, primary batteries have developed into secondary batteries, and batteries having low operating voltage have developed into batteries having high operating voltage. Among this variety of batteries, lithium secondary batteries are leading 21st battery technology and are receiving attention as energy storage systems for a variety of applications, including mobile phones and electric vehicles.

Lithium secondary batteries are energy storage devices in which lithium ions move from the anode (negative electrode) to the cathode (positive electrode) during discharge and move from the cathode to the anode during charging when storing energy in the batteries. The lithium secondary batteries have high energy density and low self-discharge rate compared to other types of batteries, and thus are used in a wide range of applications.

General lithium secondary batteries comprise a cathode, an anode, an electrolyte and a separator. In early lithium secondary batteries, lithium metal was used as the anode active material, but was replaced with carbon-based materials such as graphite, because of safety concerns resulting from the repeated charge/discharge cycles. The potential of the electrochemical reaction of the carbon-based anode active material with lithium ions is similar to that of lithium metal, and the change in the crystal structure thereof during the intercalation/deintercalation of lithium ions is low. Thus, the carbon-based anode active material can be repeatedly charged and discharged and has excellent charge/discharge cycle characteristics.

However, in recent years, as the lithium secondary battery market has expanded from small-sized lithium secondary batteries for mobile devices to large-sized lithium secondary batteries for automobiles, there is a newfound need for a technology that can achieve the high capacity and high output of anode active materials. Thus, non-carbon-based anode active materials, including silicon, tin, germanium, zinc and lead-based materials, have been actively developed, which theoretically have capacities higher than carbon-based anode active materials.

Among these, silicon-based anode active materials have a capacity of 4190 mAh/g, which is 11 times higher than the theoretical capacity (372 mAh/g) of the carbon-based anode active materials, and thus have received attention as a substitute for the carbon-based anode active materials. However, in the case of using silicon alone as the anode active material, its volume expands by a factor of 3 or more when it is intercalated by lithium ions. For this reason, the battery capacity decreases as the number of charge/discharge cycles increases, and safety concerns also arise. Thus, in order to commercially use silicon as an anode active material, many studies are required into that battery.

As a result, studies on silicon-based composites have been actively conducted. Among these, studies have been made into the use of a silicon-based material in combination with a carbon-based material. This method was developed to minimize the volume expansion of the silicon active material in order to increase capacity and charge/discharge cycle characteristics. The most fundamental method for synthesizing the composite is to coat the silicon-based material with carbon. This improves the electrical conductivity between active material particles and the electrochemical properties and the properties of the electrochemical reaction with an electrolyte and reduces the volume expansion of the silicon-based particles, resulting in an increase in the battery lifetime. However, there is a problem in that the initial charge/discharge efficiency is deteriorated due to the formation of an irreversible phase by the silicon-based material during initial charge/discharge cycling.

SUMMARY OF THE INVENTION

It is an object of the present invention to provide a porous silicon-based electrode active material for a secondary battery, which can improve the initial charge/discharge efficiency and capacity maintenance rate of the secondary battery and reduce the thickness change rate of the secondary battery to improve the lifetime characteristics.

The present invention provides a porous silicon-based electrode active material, which comprises a silicon phase, a $SiO_x$ ($0<x<2$) phase and a silicon dioxide phase and has a porosity of 7-71%.

The present invention also provides a secondary battery, which comprises a cathode comprising a cathode active material, a separator, an anode comprising an anode active material, and an electrolyte, wherein the cathode active material or the anode active material comprises a silicon-based electrode active material comprising a silicon phase, a $SiO_x$ ($0<x<2$) phase and a silicon dioxide phase and having a porosity of 7-71%.

BRIEF DESCRIPTION OF THE DRAWINGS

FIG. 1 depicts a scanning electron microscope (SEM) photograph showing the shape and crystal structure of a porous silicon-based electrode active material (FIG. 1a) according to one embodiment of the present invention and the results of X-ray diffraction (XRD) analysis of the porous silicon-based electrode active material (FIG. 1b).

DETAILED DESCRIPTION OF THE INVENTION

The present invention provides a porous silicon-based electrode active material comprising a silicon phase, a $SiO_x$ ($0<x<2$) phase and a silicon dioxide phase and having a porosity of 7-71%.

In a porous silicon-based electrode active material according to one embodiment of the present invention, the silicon dioxide phase may be dispersed in the $SiO_x$ phase, and the silicon phase and the silicon dioxide phase may be crystalline.

In a porous silicon-based electrode active material according to one embodiment of the present invention, x in the $SiO_x$ may be greater than 0 but smaller than 2, preferably 0.5-1.2, and the $SiO_x$ may be commercially easily available silicon monoxide (SiO). If the value of x is less than 0.5, the initial charge/discharge efficiency of the battery will be high, but the amount of oxygen which can suppress the volume expansion of the electrode will be small, and thus the lifetime of the electrode will be reduced and the degree of suppression of the expansion in the thickness of the electrode will be low, even though the electrode active material has a porous structure, and if the value of x is more than 1.2, the amount of oxygen will increase to reduce the initial charge/discharge efficiency of the battery.

The silicon dioxide phase may include cristoballite and may be present in an amount of 2-50 wt % based on the weight of the anode active material. If the amount of the silicon dioxide phase is less than 2 wt %, an increase in the initial charge/discharge efficiency of the battery will not be enough, and if it is more than 50 wt %, the initial discharge/discharge efficiency will increase, but the discharge capacity of the battery will decrease.

Moreover, the porosity of a porous silicon-based electrode active material according to one embodiment of the present invention may be 7-71% based on the total volume of the porous silicon-based electrode active material, the porous silicon-based electrode active material may have honeycomb-shaped pores formed on at least the surface or the surface and inside of the porous silicon-based electrode active material and may be composed of particles. If the porosity of the electrode active material is less than 7%, the volume expansion of the electrode active material during charging/discharging will not be suppressed, and if it is more than 71%, the mechanical strength of the electrode active material will be reduced due to the presence of a large amount of pores in the electrode active material, and thus the electrode active material may break down during battery fabrication processes (slurry mixing, pressing after coating, etc.).

The particle size of the electrode active material may range from several tens of nm to several tens of $\mu m$ preferably 100 nm-50 $\mu m$.

In addition, in the electrode active material, the silicon and the silicon dioxide may be present as nanometer-sized crystals in the active material particles. Herein, the crystalline silicon has a size of 1-1000 $\mu m$, and the crystalline silicon dioxide has a size of 1-1000 $\mu m$. The silicon phase, the $SiO_x$ phase and the silicon dioxide phase, which are included in the electrode active material, can intercalate and deintercalate lithium.

The silicon phase and the silicon dioxide phase may be formed by disproportionation of $SiO_x$ ($0<x<2$). The concentration of the silicon phase in the porous silicon-based electrode active material is higher center portion than center-periphery portion of the electrode active material, and the concentration of the silicon dioxide phase is higher center-periphery portion than center portion of the electrode active material. The "center portion" refers to a portion inside a line corresponding to 50% of the maximum value of the length of the electrode active material in the vertical direction from a line that is tangent to the electrode active material, and the "center-periphery portion" refers to a portion outside the line corresponding to 50%. In addition, "a concentration higher center portion than center-periphery portion of the electrode active material" means that the average concentration in the portion inside the line corresponding to 50% of the maximum value of diameter of the electrode active material is higher than the average concentration in the portion outside the line.

When a porous silicon-based electrode active material according to one embodiment of the present invention is used as an electrode active material, lithium ions (Li+) which are intercalated into the anode during the initial charge/discharge of the battery will react with silicon-based oxide to form an irreversible phase such as lithium oxide or lithium silicon oxide, in which the irreversible phase surrounds the silicon of the silicon oxide or the lithium silicon oxide, thus inhibiting the cracking or pulverization of the electrode active material. In addition, because pores are present on at least the surface or the surface and the inside of the electrode active material, they can improve the battery capacity and can efficiently control the change in volume of the battery during charge/discharge cycles, thus improving the lifetime of the battery. Although an electrode active material according to one embodiment of the present invention can be used as both a cathode active material and an anode active material, it may preferably be an anode active material.

The present invention also provides a secondary battery, which comprises a cathode comprising a cathode active material, a separator, an anode comprising an anode active material, and an electrolyte, wherein the cathode active material or the anode active material comprises a porous silicon-based electrode active material comprising a silicon phase, a $SiO_x$ ($0<x<2$) phase and a silicon dioxide phase and having a porosity of 7-71%.

The electrode active material according to one embodiment of the present invention may be used in a secondary battery by mixing with a typically used electrode active material, and the typically used electrode active material may be one or more selected from the group consisting of graphite, soft carbon, hard carbon, and lithium titanium oxide.

The prepared electrode active material, specifically an anode active material, may be prepared as an anode by using a preparation method typically used in the art. For example, the anode active material of the present invention is mixed and stirred with a binder, a solvent, and a conductive material and a dispersant if necessary to prepare slurry, and then an anode may be prepared by coating a collector with the slurry and pressing.

Examples of the binder may be a vinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, a ethylene-propylene-diene monomer (EPDM), a sulfonated EPDM, a styrene-butadiene rubber (SBR), a fluoro rubber, and various copolymers.

N-methyl-2-pyrrolidone, acetone, or water may be used as the solvent.

The conductive material is not particularly limited so long as it does not cause chemical changes in the battery and has conductivity. For example, graphite such as natural graphite or artificial graphite; carbon black such as acetylene black, Ketjen black, channel black, furnace black, lamp black, and thermal black; conductive fibers such as carbon fibers or metal fibers; metal powders such as fluoro carbon powder, aluminum powder, and nickel powder; conductive whiskers such as zinc oxide whiskers and potassium titanate whiskers; conductive metal oxides such as titanium oxide; and conductive materials such as polyphenylene derivatives may be used as the conductive material.

An aqueous-based dispersant or an organic dispersant such as N-methyl-2-pyrrolidone may be used as dispersant.

Similar to the preparation of the foregoing anode, a cathode active material, a conductive material, a binder, and a solvent are mixed to prepare a slurry, and then a cathode may be prepared by directly coating a metal collector with the slurry or by casting the slurry on a separate support and laminating a cathode active material film separated from the support on a metal collector.

Examples of the cathode active material may be a layered compound, such as lithium cobalt oxide ($LiCoO_2$) or lithium nickel oxide ($LiNiO_2$), or a compound substituted with one or more transition metals; lithium manganese oxides such as $Li_{1+y}Mn_{2-y}O_4$ (where y is 0 to 0.33), $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; nickel (Ni)-site type lithium nickel oxide expressed by a chemical formula of $LiNi_{1-y}M_yO_2$ (where M is cobalt (Co), manganese (Mn), aluminum (Al), copper (Cu), iron (Fe), magnesium (Mg), boron (B), or gallium (Ga), and y is 0.01 to 0.3); lithium manganese complex oxide expressed by a chemical formula of $LiMn_{2-y}MyO_2$ (where M is Co, Ni, Fe, chromium (Cr), zinc (Zn), or tantalum (Ta), and y is 0.01 to 0.1) or $Li_2Mn_3MO_8$ (where M is Fe, Co, Ni, Cu, or Zn); $LiMn_2O_4$ having a part of lithium (Li) being substituted with an alkaline earth metal ion; a disulfide compound; and $Fe_2(MoO_4)_3$. However, the cathode active material is not limited thereto.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. A typical porous nonwoven fabric, for example, a nonwoven fabric formed of high melting point glass fibers or polyethylene terephthalate fibers may be used, but the separator is not limited thereto.

In an electrolyte solution used in the present invention, a lithium salt, which may be included as an electrolyte, may be used without limitation so long as it is typically used in an electrolyte solution for a secondary battery. For example, one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

In the electrolyte solution used in the present invention, an organic solvent included in the electrolyte solution may be used without limitation so long as it is typically used, and typically, one or more selected from the group consisting of propylene carbonate, ethylene carbonate, diethyl carbonate, dimethyl carbonate, ethylmethyl carbonate, methylpropyl carbonate, dipropyl carbonate, dimethyl sulfoxide, acetonitrile, dimethoxyethane, diethoxyethane, vinylene carbonate, sulfolane, γ-butyrolactone, propylene sulfite, and tetrahydrofuran may be used.

In particular, ethylene carbonate and propylene carbonate, ring-type carbonates among the carbonate-based organic solvents, well dissociate the lithium salt in the electrolyte solution due to high dielectric constants as high-viscosity organic solvents, and thus, the ring-type carbonate may be used. Since an electrolyte solution having high electrical conductivity may be prepared when the ring-type carbonate is mixed with low-viscosity, low-dielectric constant linear carbonate, such as dimethyl carbonate and diethyl carbonate, in an appropriate ratio, and thus, the ring-type carbonate, for example, may be used.

Selectively, the electrolyte solution stored according to the present invention may further include an additive, such as an overcharge inhibitor, included in a typical electrolyte solution.

A separator is disposed between the cathode and the anode to form a battery structure, the battery structure is wound or folded to put in a cylindrical battery case or prismatic battery case, and then a secondary battery is completed when the electrolyte is injected thereinto. Also, the battery structure is stacked in a bi-cell structure and then impregnated with the electrolyte solution, and a secondary battery is completed when the product thus obtained is put in a pouch and sealed.

The present invention also provides a method for preparing a porous silicon-based electrode active material, the method comprising: mixing a fluorine-based solution and a metal precursor solution and bringing the mixture into contact with $SiO_x$ (0<x<2)-containing particles, thus electrodepositing metal particles on the surface of the $SiO_x$-containing particles; bringing the metal particle-electrodeposited, $SiO_x$-containing particles into contact with an etching solution, thus etching the $SiO_x$-containing particles; bringing the etched $SiO_x$-containing particles into contact with a metal removing solution, thus removing the metal particles; mixing the $SiO_x$-containing particles, from which the metal particles have been removed, with a solution of an alkaline hydroxide in a polar solvent; and evaporating the polar solvent from the $SiO_x$-containing particles, and then heat-treating the $SiO_x$-containing particles.

The method for preparing the electrode active material according to one embodiment of the present invention comprises the step of mixing a fluorine-based solution and a metal precursor solution and bringing the mixture into contact with $SiO_x$ (0<x<2)-containing particles, thus electrodepositing metal particles of the metal precursor solution on the surface of the $SiO_x$-containing particles. Herein, the fluorine-based solution causes to the $SiO_x$-containing particles to donate electrons, and the metal ions in the solution are reduced by accepting the donated electrons, and thus are electrodeposited on the surface of $SiO_x$-containing particles. Once the metal particles are electrodeposited on the surface of the $SiO_x$-containing particles, the metal particles themselves act as catalytic sites, and thus are continuously electrodeposited on the surface. The $SiO_x$-containing particles may be $SiO_x$ (0<x<2).

The fluorine-based solution that is used in the present invention may be one or more selected from the group consisting of hydrogen fluoride (HF), fluorosilicate ($H_2SiF_6$) and ammonium fluoride ($NH_4F$), and the metal precursor solution may comprise one or more selected from the group consisting of silver (Ag), gold (Au), platinum (Pt) and copper (Cu). The fluorine-based solution and the metal precursor solution can be mixed with each other at a volume ratio of 10-90:90-10. If the fluorine-based solution is used at a volume ratio of less than 10:90 in the mixing process, the amount of metal particles electrodeposited on the surface of the $SiO_x$-containing particles will be small and the reaction rate will be slow, and thus the time taken to prepare the electrode active material will be increased, and if it is used at a volume ratio of more than 90:10 in the mixing process, the rate at which the metal particles are electrodeposited on the surface of the $SiO_x$-containing particles will be very high, making it impossible to electrodeposit metal particles having a uniform and small size on the surface of the $SiO_x$-containing particles.

Moreover, the amount of metal particles electrodeposited on the surface of the $SiO_x$-containing particles can be controlled according to the concentration of the fluorine-based solution and the contact time between the $SiO_x$-containing particles and the metal precursor solution, and the $SiO_x$-containing particles may be used in an amount of 0.001-50 parts by weight based on 100 parts by weight of the mixed solution of the fluorine-based solution and the metal precursor solution.

The method for preparing the electrode active material according to one embodiment of the present invention comprises the steps of bringing the metal particle-electrodeposited, $SiO_x$-containing particles into contact with the etching solution, thus etching the $SiO_x$-containing particles. In this etching process, nanopores, mesopores and macropores are formed in the $SiO_x$-containing particles.

Etching of the $SiO_x$-containing particles is carried out in the following manner. The metal particles are oxidized to metal ions by $H_2O_2$, and the $SiO_x$-containing particles continuously enter the solution at the interface between the $SiO_x$-containing particles and the metal particles while transferring electrons to the metal particles. Also, the oxidized metal ions are reduced on the metal particles electrodeposited on the surface of the $SiO_x$-containing particles. In this way, the $SiO_x$-containing particles that have been brought into contact with the metal particles can be continuously etched in which occurs under the metal particles of the metal particle-electrodeposited, $SiO_x$-containing particles, and thus a honeycomb-shaped porous structure can be formed on at least the surface of the $SiO_x$-containing particles. During the etching process, the size of the metal particles increases, because the metal particles have a strong tendency to agglomerate with the adjacent metal particles in the etching solution.

The etching solution that is used in the present invention may be a mixed solution of a hydrogen fluoride (HF) solution and a hydrogen peroxide ($H_2O_2$) solution. The content of the hydrogen fluoride solution in the mixed solution can vary depending on the degree of etching, but the hydrogen fluoride (HF) solution and the hydrogen peroxide ($H_2O_2$) solution are preferably mixed with each other at a volume ratio of 10-90: 90-10. Herein, the content of $H_2O_2$ plays an important role in the formation of mesopores in the $SiO_x$-containing particles, and the amount of oxidation of the metal particles can be determined by the concentration of $H_2O_2$, so that the concentration of metal ions can be determined. The metal particles are oxidized to metal ions by $H_2O_2$, and the metal ions start to adhere to specific defective sites (e.g., etched $SiO_x$ portions), and the bottom of the $SiO_x$-containing particles having the metal particles attached thereto is etched, thus forming mesopores.

In addition, the etching process may be carried out for 30 minutes to 5 hours. If the etching process is carried out for less than 30 minutes, the formation of pores in the $SiO_x$-containing particles will be insignificant, and if it is carried out for more than 5 hours, the $SiO_x$-containing particles will be excessively etched, so that the mechanical properties of the $SiO_x$-containing particles will be deteriorated.

The method for preparing the electrode active material according to one embodiment of the present invention comprises the steps of bringing the etched $SiO_x$-containing particles into contact with a metal removing solution, thus removing the metal particles from the $SiO_x$-containing particles.

The metal removing solution that is used in the present invention may be one or more selected from the group consisting of nitric acid ($HNO_3$), sulfuric acid ($H_2SO_4$) and hydrochloric acid (HCl).

In addition, the method for preparing the electrode active material according to one embodiment of the present invention comprises the step of mixing the $SiO_x$-containing particles, from which metal particles have been removed, with a solution of an alkaline hydroxide in a polar solvent.

The alkaline hydroxide that is used in the present invention may be one or more selected from the group consisting of LiOH, NaOH, KOH, $Be(OH)_2$, $Mg(OH)_2$, $Ca(OH)_2$, and hydrates thereof.

As the solvent in which the alkaline hydroxide is dissolved, any solvent may be used, as long as it can dissolve the alkaline hydroxide and can easily be removed. Examples of the solvent include, but are limited to, water and an alcohol solvent. The alcohol solvent may be ethanol or methanol.

In the step of mixing the alkaline hydroxide with $SiO_x$, $SiO_x$ may be used in an amount of 0.01-30 wt % based on the total weight of the mixture. If the amount of $SiO_x$ is less than 0.01 wt %, the initial coulombic efficiency of the anode active material will be low because the amount of silicon and silicon dioxide formed after heat treatment is small ($SiO_x$ is partially converted to Si—$SiO_2$ by heat treatment, and the content of Si—$SiO_2$ in Si—$SiO_x$—$SiO_2$ is reduced due to a low content of $SiO_x$), and if it is more than 30 wt %, the capacity of the anode active material will be greatly reduced because the amount of Si—$SiO_2$ formed after heat treatment is large.

Furthermore, the method for preparing the electrode active material according to one embodiment of the present invention comprises the step of evaporating the polar solvent from the $SiO_x$-containing particles mixed with the polar solvent, followed by heat treatment.

Evaporating the polar solvent can be carried out at 80-120° C. and can be carried out in an alumina boat preheated to 80-120° C. However, evaporation of the polar solvent may also be carried out at any temperature at which the polar solvent can be evaporated. Meanwhile, despite evaporation of the polar solvent, the alkaline hydroxide remains on the surface of $SiO_x$ particles.

The mixture remaining after evaporation of the polar solvent can be heat-treated at a temperature of 750-1000° C. for 5-120 minutes. If the heat-treatment temperature is lower than 750° C., crystalline silicon dioxide will not form, and if it is higher than 1000° C., a large amount of crystalline silicon will be produced to reduce the lifetime characteristics of the secondary battery and cause an excessive amount of energy to be consumed. In addition, the heat-treatment time is shorter than 5 minutes, crystalline silicon dioxide will not form easily, and if it is longer than 120 minutes, it will not be preferable in terms of energy efficiency, because it is significantly longer than the time required to form crystalline silicon dioxide.

When heat treatment is carried out, the $SiO_x$-containing particles are disproportionated into silicon and amorphous silica ($SiO_2$). Specifically, oxygen in $SiO_x$ moves to the outside (surface) to form amorphous $SiO_2$, and silicon separated from oxygen binds to another silicon separated from oxygen to form a silicon crystal which is present in $SiO_x$ phase, and amorphous $SiO_2$ is formed mainly on the outside (surface) rather than inside the $SiO_x$ particles. As the heat-treatment temperature or time increases, amorphous $SiO_x$ gradually decreases and crystalline Si and crystalline $SiO_2$ increase.

In the present invention, the heat treatment is carried out in a state in which the alkaline hydroxide is present on the surface of SiO particles, thereby promoting the formation of crystalline $SiO_2$. When the alkaline hydroxide is not used, the crystalline peak of $SiO_2$ is not formed, even when the heat-treatment is carried out at the same temperature. However, when the alkaline hydroxide is used, the intensity of the crystalline peak of $SiO_2$ significantly increases (around 2) Theta=21° while a Si crystal grows. Specifically, in the prior art in which heat treatment is carried out in order to form a composite of SiO and carbon or in order to coat SiO with a carbon precursor or carbon, only Si crystals grow (around 2 Theta=28.5° in the XRD), whereas in the present invention in which heat treatment is carried out in a state in which the alkaline hydroxide is present on the surface of $SiO_x$, crystalline $SiO_2$ grows, and initial coulombic efficiency (discharge capacity/charge capacity×100; the ratio of lithium first charged into the silicon-based compound to the amount of lithium first discharged from the silicon-based compound) increases. Grown crystalline $SiO_2$ is electrochemically inactive (non-reactive with lithium), and SiO is divided into an electrochemically active portion (reactive with lithium) and an electrochemically inactive portion. It is believed that, because the molar concentration of oxygen relative to Si in the electrochemically active portion of SiO is lower than that in SiO, the initial coulombic efficiency increases.

In addition, the method for preparing the electrode active material according to one embodiment of the present invention may additionally comprise the step of filtering the above-prepared mixture.

The filtration step is carried out to remove the alkaline hydroxide from the surface of the heat-treated $SiO_x$-containing particles. This step can be performed by allowing the resulting mixture to stand in distilled water so that the alkaline hydroxide adhering to the surface of the porous silicon-based electrode active material is removed.

Furthermore, the method for preparing the electrode active material according to one embodiment of the present invention may additionally comprise the step of coating the surface of the electrode active material with conductive carbon, wherein the amount of conductive carbon coating the surface of the electrode active material may be 1-30 wt % based on the total weight of the silicon-based electrode material. If the amount of conductive carbon used in the coating is less than 1 wt %, a uniform coating layer will not form, so that the electrical conductivity of the electrode active material will be reduced, and if it is more than 30 wt %, an additional irreversible reaction will occur due to the conductive coating layer, thus significantly reducing the discharge capacity of the battery.

Hereinafter, the present invention will be described in further detail with reference to the preferred examples. It is to be understood, however, that these examples are for illustrative purposes only and are not intended to limit the scope of the present invention.

Example 1

Preparation of Porous Silicon-Based Electrode Active Material 1

Electrodeposition of Ag on Surface of Silicon Monoxide 300 ml of a solution of 10 mole % hydrogen fluoride (HF) was mixed with 300 ml of a solution of 10 mM silver nitrate ($AgNO_3$) for 10 minutes. 2 g of silicon monoxide (SiO) was added to and mixed with the mixed solution of fluoride hydrogen and silver nitrate for 5 minutes, after which the mixture was filtered, washed and dried, thereby preparing Ag particle-electrodeposited silicon monoxide.

Chemical Etching 200 ml of a solution of 5 mole % hydrogen fluoride and 100 ml of a solution containing 1.5 wt % of hydrogen peroxide ($H_2O_2$) were mixed with each other for 10 minutes. The Ag particle-electrodeposited silicon monoxide was added to and mixed with the etching solution consisting of the hydrogen fluoride/hydrogen peroxide mixture for 30 minutes, after which the resulting mixture was filtered, washed and dried, thereby preparing porous silicon monoxide.

Removal of Ag 100 ml of 60 mole % nitric acid ($HNO_3$) was heated to 50° C., and then the above-prepared porous silicon monoxide was added thereto and the mixture was mixed for 2 hours. Then, the mixture was filtered, washed and dried, thereby preparing porous silicon monoxide from which Ag was removed.

Mixing of Alkaline Hydroxide and Silicon-Based Material 1 g of the above-prepared porous silicon monoxide was added to a solution of 50 mg of sodium hydroxide in ethanol and stirred for 10 minutes or more.

Solvent Evaporation and Heat Treatment

The above-prepared solution containing porous silicon monoxide and sodium hydroxide was placed in an alumina boat that has been heated to 80-120° C., and ethanol was evaporated from the solution in the alumina boat. After the solvent had completely evaporated, the alumina boat containing the porous silicon monoxide/sodium hydroxide mixture was placed in a quartz tube furnace in which the mixture was then heat-treated at 800° C. for 5 minutes in an argon atmosphere. Then, the quartz tube furnace was cooled to room temperature, thereby preparing a porous silicon-based electrode active material.

Immersion in Solvent, Followed by Filtration

The porous silicon-based electrode active material was recovered from the alumina boat and immersed in distilled water, after which the solution was filtered, thereby removing sodium hydroxide from the porous silicon-based electrode active material.

Example 2

Preparation of Porous Silicon-Based Electrode Active Material 2

An electrode active material was prepared in the same manner as Example 1, except that the Ag particle-electrodeposited silicon monoxide was added to and mixed with the etching solution consisting of the hydrogen fluoride/hydrogen peroxide mixture for 5 hours.

Example 3

Preparation 3 of Porous Silicon-Based Electrode Active Material

An electrode active material was prepared in the same manner as Example 1, except that the heat treatment was carried out for 120 minutes.

Example 4

Preparation 4 of Porous Silicon-Based Electrode Active Material

An electrode active material was prepared in the same manner as Example 1, except that the Ag particle-electrodeposited silicon monoxide was added to and mixed with the etching solution consisting of the hydrogen fluoride/hydrogen peroxide mixture for 5 hours and that the heat treatment was carried out for 120 minutes.

Example 5

Preparation of Porous Silicon-Based Electrode Active Material Having Carbon Coating Layer Formed Thereon 20 g of the porous silicon-based electrode active material prepared in Example 1 was introduced into a rotary tube furnace, and argon gas was supplied into the furnace at a rate of 0.5 L/min, and then the internal temperature of the rotary tune furnace was increased to 800° C. at a rate of 5° C./min. While the rotary tube furnace was rotating at a speed of 10 rpm, the electrode active material was reacted for 3 hours while argon gas and acetylene gas were supplied to the furnace at rates of 1.8 L/min and 0.3 L/min, respectively, thereby preparing a porous silicon-based electrode active material having a conductive carbon coating layer formed thereon. The carbon content of the conductive carbon coating layer was 10 wt % based on the weight of the electrode active material.

Examples 6 to 8

Preparation of Porous Silicon-Based Electrode Active Materials Having Carbon Coating Layer Formed Thereon Porous silicon-based electrode active materials having a conductive carbon coating layer formed thereon were prepared in the same manner as Example 5, except that 20 g of the porous silicon-based electrode active materials prepared in Examples 2 to 4 was introduced into the rotary tube furnace. The carbon content of each of the conductive carbon coating layers was 10 wt % based on the weight of each of the electrode active materials.

Example 9

Fabrication of Secondary Battery

The electrode active material, prepared in Example 1, was used as an anode active material, acetylene black was used as a conductive material, and polyvinylidene fluoride (PVdF) was used as a binder, and these were mixed with each other at a weight ratio of 88:2:10. The mixture was dissolved in the solvent N-methyl-2-pyrrolidone, thereby preparing slurry. The prepared slurry was applied to one surface of a copper current collector to a thickness of 65 μm and the resulting structure was dried, rolled, and punched to a desired size, thereby fabricating an anode.

Meanwhile, ethylene carbonate and diethyl carbonate were mixed with each other at a volume ratio of 30:70 to prepare a non-aqueous electrolyte solvent, and $LiPF_6$ was added to the non-aqueous electrolyte solvent, thereby preparing a non-aqueous electrolyte of 1M $LiPF_6$.

A lithium metal foil was used as a counter electrode. A polyolefin separator was interposed between the anode and the counter electrode, and then the electrolyte was injected into the resulting structure, thereby fabricating a coin-type battery.

Examples 10 to 16

Secondary batteries were fabricated in the same manner as Example 9, except that each of the electrode active materials prepared in Examples 2 to 8 was used the anode active material.

Comparative Example 1

A secondary battery was fabricated in the same manner as Example 9, except that non-porous silicon monoxide was used as the anode active material.

Comparative Example 2

A secondary battery was fabricated in the same manner as Example 9, except that a conductive carbon coating layer was formed on non-porous silicon monoxide in the same manner as Example 5.

Test Example 1

Analysis of Shape and Crystal Structure of Porous Silicon-Based Electrode Active Material The shape and crystal structure of the porous silicon-based electrode active material prepared in Example 1 of the present invention were analyzed by scanning electron microscopy (SEM) and X-ray diffraction (XRD), and the results of the analysis are shown in FIG. 1.

As can be seen in FIG. 1, the porous silicon-based electrode active material prepared in Example 1 has a large number of pores (see FIG. 1a) and includes crystalline silicon, amorphous $SiO_x$ and crystalline $SiO_2$ (cristoballite) (see FIG. 1b).

Test Example 2

Analysis of Lifetime and Thickness Change Rate

In order to examine the lifetime characteristics and thickness change rates of the secondary batteries fabricated in Examples 9 to 16 and Comparative Examples 1 and 2, the following tests were carried out.

The lifetime of each of the batteries was measured by repeating the charge/discharge cycles at 0.5 C after the second cycle and was expressed as the ratio of the 49th cycle discharge capacity to the first-cycle discharge capacity.

Each of the secondary batteries was disassembled after the 50th cycle charge, and the thickness of the electrode in each battery was measured. Then, the difference in thickness of the measured electrode from that of the electrode measured before charging was determined and expressed as the thickness change rate of each battery.

Table 1 below shows the porosity, lifetime and thickness change rate of each of the secondary batteries fabricated in Examples 9 to 16 and Comparative Examples 1 and 2.

TABLE 1

| Examples | Porosity (%) | lifetime (%) | Thickness change rate (%) |
|---|---|---|---|
| Example 9 | 10 | 89 | 160 |
| Example 10 | 71 | 98 | 44 |
| Example 11 | 8 | 91 | 44 |
| Example 12 | 68 | 97 | 49 |
| Example 13 | 9 | 91 | 147 |
| Example 14 | 65 | 99 | 41 |
| Example 15 | 7 | 93 | 153 |
| Example 16 | 58 | 98 | 47 |
| Comparative Example 1 | 0 | 85 | 194 |
| Comparative Example 2 | 0 | 87 | 178 | lifetime (49th cycle discharge charge/1st cycle discharge capacity)×100

Thickness change rate: (electrode thickness after 50th cycle charge−electrode thickness before charging)/electrode thickness before charging×100

As can be seen in Table 1 above, the lifetime of the secondary batteries fabricated in Examples 9 to 16 was increased by 2-14% compared to that of the secondary batteries fabricated in Comparative Examples 1 and 2, and the thickness change rate thereof was different by 14-153% from that of the secondary batteries fabricated in Comparative Examples 1 and 2. Thus, it can be seen that, because the electrode active materials prepared in the Examples of the present invention include not only oxygen, unlike Si electrode active materials, but also a large number of pores, the lifetime and swelling characteristics of the batteries were greatly improved.

Test Example 3

Analysis of Charge/Discharge Characteristics and Initial Coulombic Efficiency

In order to examine the charge/discharge characteristics and initial coulombic efficiencies of the secondary batteries fabricated in Examples 9 to 16 and Comparative Examples 1 and 2, the following tests were carried out.

To examine the charge/discharge characteristics of the secondary batteries fabricated in Examples 9 to 16 and Comparative Examples 1 and 2, each of the batteries was charged with a constant current to 5 mV, and then charged until the current reached 0.005 C at 5 mV.

Table 2 below shows the discharge capacity, charge capacity and initial coulombic efficiency of each of the secondary batteries fabricated in Examples 9 to 16 and Comparative Examples 1 and 2.

TABLE 2

| Examples | Discharge capacity (mAh/g) | Charge capacity (mAh/g) | Initial coulombic efficiency (%) |
| --- | --- | --- | --- |
| Example 9 | 1575.6 | 2021.8 | 77.9 |
| Example 10 | 1580.5 | 2025.4 | 78.0 |
| Example 11 | 1083.9 | 1380.5 | 78.5 |
| Example 12 | 1085.2 | 1381.7 | 78.5 |
| Example 13 | 1526.5 | 1853.9 | 82.3 |
| Example 14 | 1530.1 | 1857.2 | 82.4 |
| Example 15 | 1048.1 | 1262.4 | 83.0 |
| Example 16 | 1049.8 | 1262.8 | 83.1 |
| Comparative Example 1 | 1653.8 | 2355.8 | 70.2 |
| Comparative Example 2 | 1575.0 | 2114.1 | 74.5 |

As can be seen in Table 2 above, the discharge capacities of the secondary batteries fabricated in Examples 9 to 16 were somewhat lower than that of the secondary battery fabricated in Comparative Example 1, but the initial coulombic efficiencies thereof were at least about 8% higher than that of the secondary battery fabricated in Comparative Example 1. In addition, the initial coulombic efficiencies of the secondary batteries fabricated in Examples 13 to 16 were at least about 5% higher than that of the secondary battery fabricated in Comparative Example 2. Meanwhile, the initial coulombic efficiencies of the secondary batteries of Examples 13 to 16 and Comparative Example 2 were increased by about 4%, because of formation of the carbon coating layer.

As described above, the electrode active material according to the embodiment of the present invention includes pores formed on the surface and inside of a silicon oxide, and thus a secondary battery comprising the same has a high capacity. In addition, the change in the volume of the electrode active material of the present invention during charge/discharge cycles can be efficiently controlled, and thus the lifetime characteristics of the battery can be improved. Furthermore, the initial coulombic efficiency of the electrode active material of the present invention is increased over that of prior silicon-based electrode active materials, and the electrode active material can be prepared in large amounts by a simple process. Accordingly, the electrode active material of the present invention is useful as an electrode active material for a secondary battery.

What is claimed is:

1. A porous silicon-based electrode active material comprising:
a silicon phase,
a $SiO_x$ ($0<x<2$) phase, and
a silicon dioxide phase dispersed in the $SiO_x$ phase,
wherein the silicon dioxide phase is crystalline and comprises cristoballite,
wherein the silicon dioxide phase is present in an amount of 2-50 wt % based on the weight of the silicon-based anode active material,
wherein the porous silicon-based anode active material has a porosity of 7-71%, and
wherein a concentration of the silicon phase is higher center portion than center-periphery portion of the electrode active material and a concentration of the silicon dioxide phase is higher center-periphery portion than center portion of the electrode active material.

2. The porous silicon-based electrode active material of claim 1, wherein x in the $SiO_x$ is 0.5-1.2 or the $SiO_x$ is silicon monoxide.

3. The porous silicon-based electrode active material of claim 1, wherein the electrode active material comprises honeycomb-shaped pores on at least a surface thereof.

4. The porous silicon-based electrode active material of claim 1, wherein the silicon phase and the silicon dioxide phase is formed by disproportionation of $SiO_x$ ($0<x<2$).

5. A secondary battery, which comprises a cathode comprising a cathode active material, a separator, an anode comprising an anode active material, and an electrolyte, wherein the cathode active material or the anode active material comprises the electrode active material of any one of claims 1 to 4.

6. The secondary battery of claim 5, wherein the cathode active material or the anode active material further comprises one or more selected from the group consisting of graphite, soft carbon, hard carbon, and lithium titanium oxide.

7. A method for preparing a porous silicon-based electrode active material, the method comprising:
mixing a fluorine-based solution and a metal precursor solution and bringing the mixture into contact with $SiO_x$ ($0<x<2$)-containing particles, thus electrodepositing metal particles on the surface of the $SiO_x$-containing particles;
bringing the metal particle-electrodeposited, $SiO_x$-containing particles into contact with an etching solution, thus etching the $SiO_x$-containing particles;
bringing the etched $SiO_x$-containing particles into contact with a metal removing solution, thus removing the metal particles;
mixing the $SiO_x$-containing particles, from which the metal particles have been removed, with a solution of an alkaline hydroxide in a polar solvent; and
evaporating the polar solvent from the $SiO_x$-containing particles, and then heat-treating the $SiO_x$-containing particles.

8. The method of claim 7, wherein the fluorine-based solution is one or more selected from the group consisting of hydrogen fluoride (HF), fluorosilicate ($H_2SiF_6$) and ammonium fluoride ($NH_4F$) and the metal precursor solution comprises one or more selected from the group consisting of silver, gold, platinum and copper and the fluorine-based solution and the metal precursor solution are mixed with each other at a volume ratio of 10-90:90-10.

9. The method of claim 7, wherein the $SiO_x$-containing particles are used in an amount of 0.001-50 parts by weight based on 100 parts by weight of the mixed solution of the fluorine-based solution and the metal precursor solution.

10. The method of claim 7, wherein the etching occurs under the metal particles of the metal particle-electrodeposited, $SiO_x$-containing particles.

11. The method of claim 7, wherein the etching solution is a mixed solution of hydrogen fluoride (HF) and hydrogen peroxide ($H_2O_2$) and the hydrogen fluoride (HF) and hydrogen peroxide ($H_2O_2$) are mixed with each other at a volume ratio of 10-90:90-10.

12. The method of claim 7, wherein the metal removing solution is one or more selected from the group consisting of nitric acid, sulfuric acid and hydrochloric acid.

13. The method of claim 7, wherein the alkaline hydroxide is one or more selected from the group consisting of LiOH, NaOH, KOH, $Be(OH)_2$, Mg(OH), $Ca(OH)_2$, and hydrates thereof.

14. The method of claim 7, wherein the $SiO_x$, from which metal particles have been removed, is mixed in an amount of 0.01-30 wt % based on the weight of the alkaline hydroxide.

15. The method of claim 7, wherein the heat treatment is carried out at 750-1000° C. for 5-120 minutes.

16. The method of claim 7, wherein the $SiO_x$-containing particles are disproportionated into silicon and silicon dioxide by the heat treatment.

17. The method of claim 7, wherein the method further comprises filtering the heat-treated $SiO_x$-containing particles.

18. The method of claim 7, wherein the method further comprises coating the heat-treated $SiO_x$-containing particles with carbon.

19. The method of claim 18, wherein the carbon is used in an amount of 1-30 wt % based on the total weight of the electrode active material.

* * * * *